US011384575B2

(12) United States Patent
Bellavia et al.

(10) Patent No.: US 11,384,575 B2
(45) Date of Patent: Jul. 12, 2022

(54) KEEPER AND AIRCRAFT WITH SUCH KEEPER

(71) Applicant: LISI AEROSPACE, Paris (FR)

(72) Inventors: Bastien Bellavia, Mereau (FR); Boris Hummel, Quincy (FR)

(73) Assignee: LISI AEROSPACE, Paris (FR)

( * ) Notice: Subject to any disclaimer, the term of this patent is extended or adjusted under 35 U.S.C. 154(b) by 916 days.

(21) Appl. No.: 16/032,516

(22) Filed: Jul. 11, 2018

(65) Prior Publication Data

US 2019/0017304 A1   Jan. 17, 2019

(30) Foreign Application Priority Data

Jul. 13, 2017   (FR) ...................................... 1756671

(51) Int. Cl.
*E05C 3/04* (2006.01)
*B64C 1/14* (2006.01)
(Continued)

(52) U.S. Cl.
CPC ............ *E05C 3/045* (2013.01); *B64C 1/1407* (2013.01); *E05B 15/022* (2013.01);
(Continued)

(58) Field of Classification Search
CPC .............. Y10T 292/68; Y10T 292/696; Y10T 292/699; Y10T 292/702; Y10T 292/0908;
(Continued)

(56) References Cited

U.S. PATENT DOCUMENTS 4,225,166 A * 9/1980 Tanaka ................... E05B 63/24
292/341.17
4,911,488 A * 3/1990 Brackmann ........... E05B 85/045
200/61.64
(Continued)

FOREIGN PATENT DOCUMENTS

DE          3740757 A1   6/1989
DE          9421878 U1   1/1997
(Continued)

OTHER PUBLICATIONS

Cruyplant, Lieve, Preliminary Search Report and Written Opinion, dated Mar. 9, 2018, 6 pages, Intellectual Property Office of France, France.

*Primary Examiner* — Christine M Mills
*Assistant Examiner* — Faria F Ahmad
(74) *Attorney, Agent, or Firm* — Henricks Slavin LLP

(57) ABSTRACT

The invention involves a keeper (20) to interact with a bolt (16) of a lock (10);
The keeper includes a bracket (22) for attachment to a structure, and a keeper rod (24) secured to the bracket, the keeper rod extending from one surface (27) of the bracket. In the keeper, a shaft (32) is attached to the bracket and can rotate freely relative to the bracket such that it extends in a longitudinal direction (X); a blade (40) is mounted on the shaft (32) on one side of the bracket near the keeper rod in such a way as to always rotate along with the shaft; an angular position indicator (46) is also mounted so as to always rotate along with the shaft; the blade being so positioned that it can be rotated by the latch when the latch hooks on to or releases from the keeper rod, and the angular position indicator (46) being capable of indicating the angular position of the blade.

(Continued)

The invention is for example intended to be used on an aircraft door such as that of a helicopter.

17 Claims, 3 Drawing Sheets

(51) Int. Cl.
    *E05B 85/04*         (2014.01)
    *E05B 15/02*         (2006.01)
    *E05B 15/10*         (2006.01)
    *E05C 19/12*         (2006.01)
    *E05B 47/00*         (2006.01)

(52) U.S. Cl.
    CPC ........ *E05B 15/0295* (2013.01); *E05B 15/101* (2013.01); *E05B 85/045* (2013.01); *E05C 19/12* (2013.01); *B64C 1/1415* (2013.01); *B64C 1/1423* (2013.01); *E05B 2047/0069* (2013.01); *E05Y 2900/502* (2013.01); *Y10T 292/0908* (2015.04); *Y10T 292/68* (2015.04); *Y10T 292/696* (2015.04); *Y10T 292/699* (2015.04); *Y10T 292/702* (2015.04)

(58) Field of Classification Search
    CPC ........ E05C 3/045; E05C 19/12; E05B 85/045; E05B 15/022; E05B 15/0295; E05B 15/101; E05B 2047/0069; E05B 81/66; E05B 17/22; E05B 41/00; B64C 1/1407; B64C 1/1415; B64C 1/1423; B64C 1/1446; B64C 1/14; B64C 1/143; B64C 1/1438; E05Y 2900/502; B64D 29/08
    See application file for complete search history.

(56) References Cited

U.S. PATENT DOCUMENTS

| | | | | |
|---|---|---|---|---|
| 5,600,868 A | * | 2/1997 | Tourville | E05F 1/1223 16/277 |
| 5,707,092 A | * | 1/1998 | Van Slembrouck | E05B 85/045 292/341.12 |
| 5,711,559 A | * | 1/1998 | Davis | E05B 17/10 292/340 |
| 5,722,706 A | * | 3/1998 | Bartel | E05B 85/045 200/61.64 |
| 5,785,365 A | * | 7/1998 | Lorey | E05B 85/045 292/216 |
| 5,921,612 A | * | 7/1999 | Mizuki | E05B 81/25 296/155 |
| 6,241,039 B1 | * | 6/2001 | Jarnstrom | E05B 15/022 180/69.21 |
| 6,382,690 B1 | * | 5/2002 | Dessenberger, Jr. | E05B 41/00 292/113 |
| 6,581,990 B1 | * | 6/2003 | Menke | E05B 81/22 292/201 |
| 7,021,090 B1 | * | 4/2006 | Nolle | E05B 65/0089 292/281 |
| 2003/0075934 A1 | * | 4/2003 | Oxley | E05B 81/22 292/341.16 |
| 2005/0218670 A1 | * | 10/2005 | Brose | E05B 81/22 292/341.16 |
| 2005/0236845 A1 | * | 10/2005 | Bird | E05B 85/045 292/216 |
| 2009/0289463 A1 | * | 11/2009 | Tsai | E05D 15/0639 292/341.15 |
| 2010/0257786 A1 | * | 10/2010 | Rock | E05B 17/0037 49/276 |
| 2011/0210568 A1 | * | 9/2011 | Williams | E05B 15/024 292/341.15 |
| 2017/0284134 A1 | * | 10/2017 | Schwickerath | E05B 81/80 |
| 2019/0390491 A1 | * | 12/2019 | Yokogawa | E05B 83/38 |
| 2020/0070987 A1 | * | 3/2020 | Roder | B64C 1/1423 |
| 2020/0324629 A1 | * | 10/2020 | Nakamura | E05B 85/045 |

FOREIGN PATENT DOCUMENTS

| | | | |
|---|---|---|---|
| EP | 1111168 A2 | 6/2001 | |
| EP | 3345825 A1 * | 7/2018 | ............ E05B 77/16 |
| JP | H0654064 B2 | 7/1994 | |
| WO | WO2014/096618 A1 | 6/2014 | |

* cited by examiner

KEEPER AND AIRCRAFT WITH SUCH KEEPER

BACKGROUND

This invention relates to a keeper comprising a mechanical system detecting the closing or opening of the locking system, and which interacts in particular with a bolt on the door of an aircraft such as an aircraft or helicopter.

In general, and in most aircraft, the opening of a door is enabled by hinges on a door jamb, and the door is held closed by one or more latches locking the door to an aircraft fuselage structure. It is obviously essential that, during flight, all the locks are properly closed, all the more so when the aircraft cabin is pressurized in flight, since the force exerted on the door resulting from this pressure, which can exceed 500 millibars, could cause it to open if the locking system fails. It is therefore important to be able to quickly, safely and reliably ensure that all aircraft latch bolts are properly locked before take-off.

Today, in most cases, this monitoring relies almost entirely on the vigilance of the operator performing the locking operation. During this operation, it is not easy to detect that one or more latch bolts are not properly closed because the locking of a single bolt moves the door inside its frame, and the door then appears to be properly closed.

Occasionally, errors have caused a door to open unintentionally in flight. A clear indicator that doors are locked is therefore a source of significant improvement in flight safety. Thus, to provide an effective detection system, it must be possible to indicate the locked or unlocked status of each bolt in a reliable and perfectly observable manner.

One of the challenges for a mechanical latch detection system is to ensure that the latch release indicator indicates that a latch is unlocked and not merely the position of the latch handle, when the desired mechanical function is the stressing of the latches. There is therefore a need for a locking detection system that meets the above requirements.

Invention Summary

To do so, the present invention is intended to be a keeper that interacts with a bolt of a lock, the keeper comprising a bracket to be attached to a structure, and a keeper rod secured to the bracket, with the keeper rod extending from a first surface of the bracket.

In the keeper:
  a shaft is secured to the bracket and can rotate freely with respect to said bracket so as to extend in a longitudinal direction X;
  a blade is rotationally-fixed arranged on the shaft of a first side of the bracket near the keeper rod;
  an angular position indicator is rotationally-fixed arranged on the shaft;
the blade being arranged in such a way that it can be turned by the latch when the bolt hooks on to or disengages from the keeper rod, and the angular position indicator being capable of indicating the angular position of the blade.

With the help of such a mechanism, it is thus possible simply and reliably to check by looking at the angular position indicator whether the hook has actually latched on to the keeper rod, and thus whether the latch is actually locked. If this is not the case, i.e. when the hook has not latched on to the keeper rod, it does not push the blade, and this can also be detected by looking at the indicator.

The keeper of this invention shall ideally have all or some of the following features, provided that they are technically feasible:

the keeper shall have a means for returning the blade to a stable unlocked position and the angular position indicator to an open position when the bolt is disengaged from the keeper rod and no force is being exerted on the blade;

the means for returning the blade to the stable unlocked position shall include a compression spring and a cam located between the bracket and the position indicator, with the cam being rotationally-fixed and able to move freely longitudinally, the cam being designed to return and maintain the shaft in the open position on the angular position indicator when no force is being exerted on the blade;

the cam has a V-shaped recessed cam profile, and the keeper further includes a non-rotating pin relative to the shaft, the pin being capable of sliding across the V-shaped cam profile as a result of a rotation of the blade and as a result of the action of the spring keeping the cam in contact with the pin;

the angular position indicator includes a hub rotationally-fixed arranged on the shaft, being thus rotated in relation to the angular movements of the blade with which it is synchronized;

the angular position indicator has at least one strut extending radially outwards from the hub. The movement of the end of the strut, which corresponds to the angular movement of the blade, is thus amplified;

the pin adapted to slide across the cam profile is attached to the hub of the position indicator;

the shaft has a flat spot at each end, the blade and the hub each having a flat on an inner surface of an opening in the blade and an opening in the hub, the flats being arranged to work together with the flat spots of the shaft to block rotation of the blade and hub on the shaft when the shaft is engaged in the openings. This results in a rotating assembly consisting of the shaft, the blade and the angular position indicator that can be simply built and assembled, and one that is free of excessive play;

the cam and the spring are free to slide on a spacer, with the spacer being fixed relative to the bracket and accommodating a portion of the shaft in an axial hole in the spacer;

the spacer comprises a flat bar on an outer surface, and the cam comprises a flat on an inner surface, with the flat bar on the cam capable of interacting with the flat on the spacer to block rotation of the cam on the spacer. This simple configuration allows the cam to remain free to move on the spacer and to maintain its angular orientation with respect to the bracket so as to ensure that the angular position indicator, and therefore the blade, is stable and precise when in the open position;

the keeper has a housing with an opening opposite the position indicator to allow a sensor to detect a position reading;

the shaft, the blade and the angular position indicator are located on one side of the bracket on the side of the first surface of said bracket and the keeper rod extends from this first surface. This configuration makes it possible to create a compact keeper that can be attached to the support structure without being intrusive with respect to this structure;

the shaft passes through the bracket in such a manner as to extend on either side of said bracket; and the blade is rotationally-fixed arranged at one end of the shaft; and the angular position indicator is rotationally-fixed arranged at a second end of the shaft. This configuration separates, by the physical barrier of the bracket, the detection function from the indication function of the latch status, which makes it possible, in particular, to place angular position sensors inside a structure to which the keeper plate is attached;

the compression spring and the cam are arranged between a second surface of the bracket, which is opposite the first surface, and the angular position indicator;

the hub is rotationally-fixed mounted near the second end of the shaft, the housing includes a first opening on a strut positioned opposite the second surface of the bracket to receive the second end of the shaft;

the housing includes a second opening on a strut facing the position indicator to enable a sensor to register a position reading.

This invention is also relevant to aircraft with at least one movable panel equipped with at least one lock with a rotating movable bolt. At least one structure of the aircraft is equipped with a keeper according to the invention, the keeper rod of which interacts with the bolt of the at least one lock to keep the movable panel in the locked position on the structure.

The mobile panel may be a door, or a hatch, or an engine cowling, for which it is particularly important that the aircraft crew have reliable information indicating that it is correctly locked.

Specifically, the aircraft is either a helicopter or an airplane.

BRIEF DESCRIPTION OF THE DRAWINGS

The present invention will be better understood from the following detailed description, made in association with the drawings in which:

To simplify comprehension of the drawings, only the elements necessary for the understanding of the invention are shown. FIGS. 3 to 6 represent the identical version of the invention, and the same elements bear the same references from one drawing to another.

DETAILED SPECIFICATION

Figure 1:
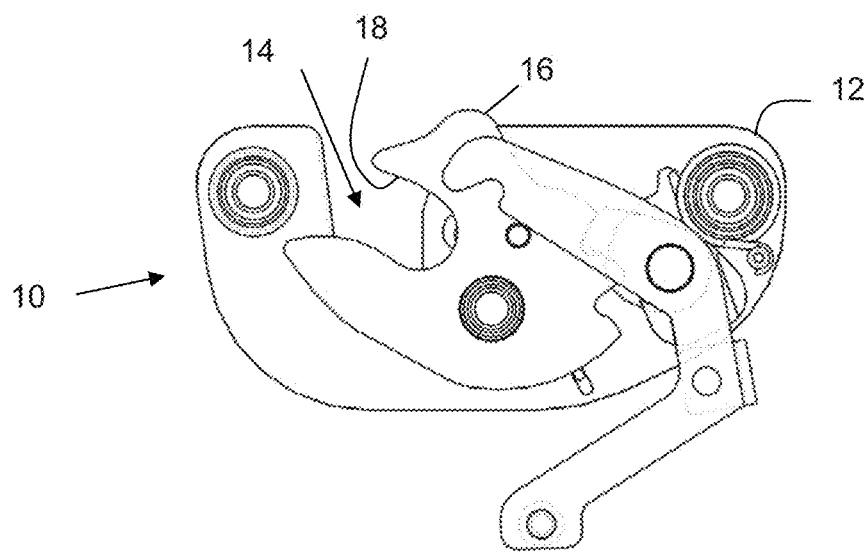
FIG. 1 is a view of a lock of prior art in which a lateral cover is not shown in order to display the internal mechanical elements of the lock in which hidden parts are represented as transparent outlined shapes.

FIG. 1 shows a lock 10 of prior art described in patent application WO2014/096618A1. Lock 10 is intended to be mounted on a swing or sliding door of a helicopter. In this particular case, lock 10 is therefore mobile in relation to a helicopter frame.

Lock 10 comprises a body 12 with a notch 14 forming a cone-shaped opening. The lock also has a bolt 16 that rotates inside the body of the lock, with bolt 16 having a hook-shaped profile 18. The opening 14 is designed to accommodate a keeper that includes a keeper rod, positioned along an axis essentially perpendicular to the body 12. The hook shape 18 is designed to wrap around the keeper rod.

FIGS. 2 to 6 show a keeper 20 manufactured according to an embodiment of the invention.

Keeper 20, for example, is attached to a structural part (not shown) of a helicopter by means of a bracket 22, for example by means of rivets or bolts extending through openings 26 provided on the bracket. Bracket 22 has a keeper rod 24 extending from a first surface 27 of the bracket in a longitudinal direction X substantially perpendicular to the said first surface of the bracket. The bracket has a second surface 28 opposite the first surface 27 and essentially parallel to the first surface.

Figure 2:
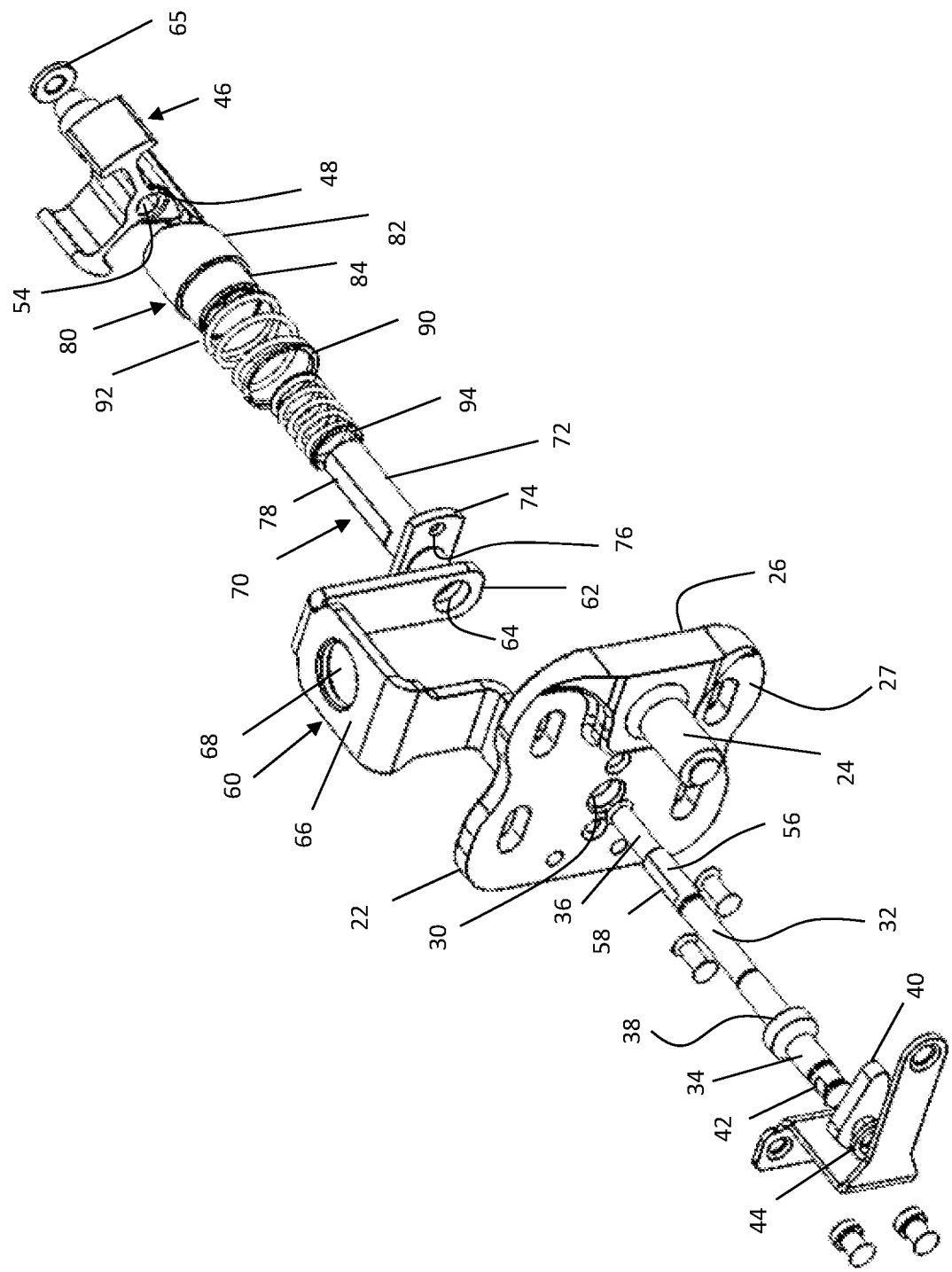
FIG. 2 is an exploded isometric view of the keeper according to an embodiment of the invention.
Figures 4, 5:
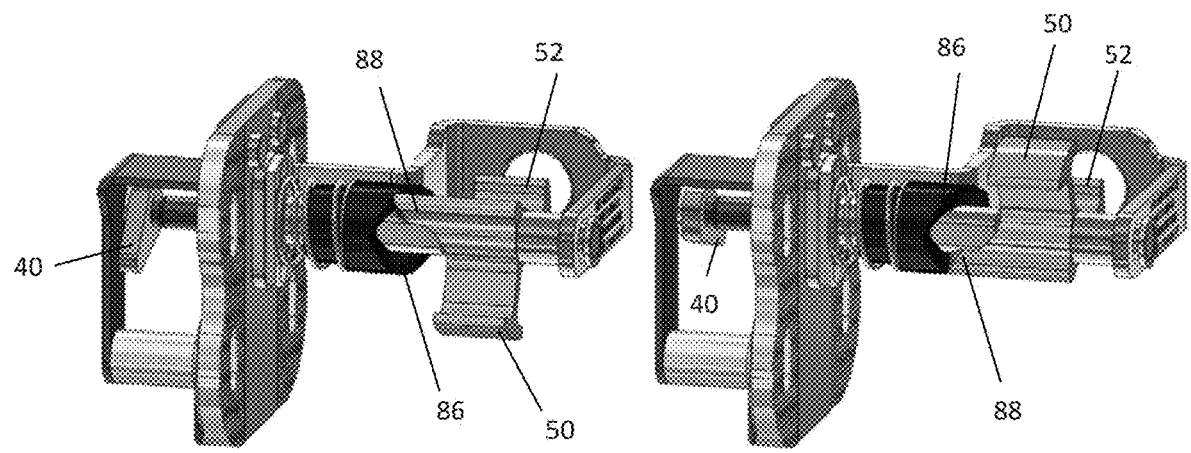
FIG. 4 is an isometric view of the keeper in FIG. 2, assembled, in a first locked position.
FIG. 5 is an isometric view of the keeper in FIG. 2, assembled, in a second locked position.
Figure 6:
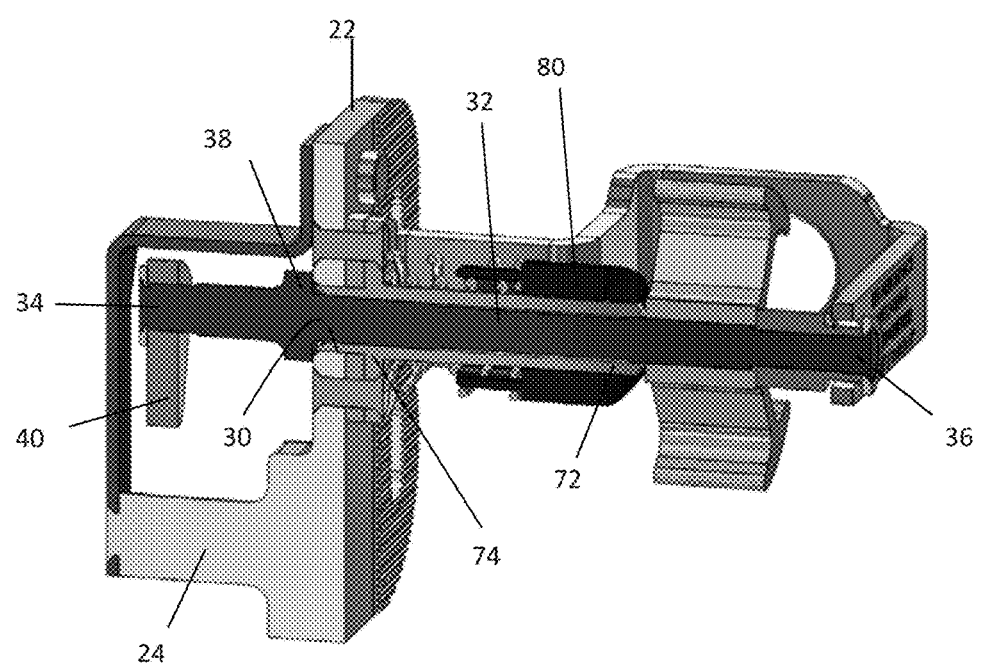
FIG. 6 is a cross-sectional view of the keeper in FIG. 3.

As shown in FIG. 2, the bracket has a circular opening 30 to receive a shaft 32 extending in direction X, and the shaft 32 is parallel to the axis along which the keeper rod 24 extends. The shaft has a first end 34 and a second end 36, and a flange 38 extending radially outward and located between the two ends. The outer diameter of the flange 38 is larger than the diameter of the opening 30 in order to prevent the movement of the shaft 32 into the bracket in one direction. The outer diameter of the shaft 32 is smaller than the diameter of opening 30 to allow the shaft to rotate in opening 30.

A blade 40 is positioned on the first end 34 of the shaft 32. The first end 34 has a flat bar 42, and the blade features an opening on an inner surface which there is a flat which interacts with the flat bar 42 to immobilize the rotating blade on the shaft 32. A washer 44 is fastened on the end 34 in order to prevent the blade 40 from moving along the shaft. Alternatively, the blade may be fixed to the shaft by any other means, or may form a portion of the shaft 32, for example by an additive manufacturing process. In this case, the shaft does not need a flat bar and no washer needs to be fitted.

The position of the opening 30, the length of the portion of the shaft 32 lying on the same side as the keeper rod and the dimensions of the blade 40 are chosen so that, once attached to the shaft 32, the blade extends towards the keeper rod and can be rotated by an upper branch of the hook 18 of the lock when said keeper rod is engaged in the lock.

In the example shown in FIGS. 2 to 5, the blade 40 is approximately triangular in shape (when viewed parallel to the longitudinal direction X), and one tip of this triangle can be rotated, along with the shaft 32 to which the blade is attached, in one rotational direction or the other by a bolt hooking on to the keeper rod. When the lock is open, the latch is not latched on to the keeper rod and the tip is positioned substantially on the same plane as the shaft 32 and the keeper rod 24. This position is referred to as "unlocked" in the rest of the description. On the contrary, when the lock is closed and the bolt latches on to the keeper rod, the tip, pushed back by the bolt, is positioned at an angle to the plane constituted by the shaft 32 and keeper rod 24. This position is referred to as "locked" in the rest of the description.

Obviously, the blade shape is not restricted to the shape shown, and any other shape allowing the blade to be turned and accordingly the shaft 32 to rotate is suitable.

The keeper also includes a position indicator 46 located near the second end 36 of the shaft. In the example shown, the position indicator 46 is constructed as a hub 48 with two struts 50, 52 extending radially outward from the hub. The hub 48 includes an opening 54 designed to receive a 56 portion of the shaft 32. This portion 56 comprises a flat spot 58 which interacts with a flat fitted on an inner wall of the opening 54, in order to prevent the hub from rotating on the shaft. As indicated in the case of the blade, the hub can be attached to the shaft by any other means or can constitute a part of the shaft 32 by being manufactured using an additive manufacturing process. Naturally, solutions should be chosen which, when combined, make it possible to carry out the assembly of the keeper.

The keeper also includes a housing 60 attached to the second surface 28 of the bracket 22. The housing comprises a strut 62 extending parallel to the bracket and equipped with a first opening 64 receiving the second end 36 of the shaft 32. A washer 65 is mounted on the second end of the shaft to prevent the shaft 32 from moving. The housing has a wall 66 joining the bracket 22 to the strut 62 with a second opening 68 for a position sensor (not shown). The position of the opening 68 is chosen so that it faces the position indicator 46.

The blade can be rotated clockwise or counter-clockwise to suit different lock types. The position indicator 46 therefore has two struts which can indicate that the blade 40 has turned in one direction or the other. The position of the struts is detected by the position sensor located near the position indicator 46. In the unlocked position shown in FIG. 3, the sensor does not detect either strut. In the locked position shown in FIG. 4 or 5, each corresponding to one of the possible blade rotation directions, the sensor detects a strut 50 or 52, depending on the direction of blade rotation.

Alternatively, the hub may have only one strut, in which case only a locking position is detected. Furthermore, the position indicator is not limited to the means described. The end 36 of the shaft 32 can thus include RFID markings or systems that can be read by a specific sensor other than a position sensor.

Importantly, the keeper 20 features a means for returning the blade to the unlocked position with regard to the keeper when the latch bolt is removed from the keeper rod 24. The shape of the blade shown prevents it from being moved back to the unlocked position when the hook is unlatched from the keeper rod, since the outer surface upper branch of the hook will slide over the blade without hooking on to it.

Thus, the keeper comprises a spacer 70, a cam 80 and a compression spring 90 positioned on the shaft 32, all three lying between the second surface 28 of the bracket and the position indicator 46.

The spacer 70 has a tubular body 72 whose inner diameter is designed to accommodate a central portion of the shaft 32 and a flange 74 whose diameter is greater than the diameter of the opening 30 of the bracket. The flange is equipped with openings that interact with specially provided openings on the bracket to secure the spacer to the bracket and prevent it from rotating relative to the bracket. Other means of fixing the spacer to the shaft are possible, for example by gluing. The outer surface of the tubular body 32 of the spacer has a flat bar 78.

The cam 80 has a tubular body 82, the inner diameter of which is designed to accommodate the tubular body 72 of the spacer. An inner wall of the tubular body includes a flat which interacts with the flat bar 78 of the spacer, in order to prevent the cam from rotating on the spacer 70. One end 84 of the cam is stepped so as to form a supporting surface for a one end 92 of the compression spring 90. The second end 94 of the compression spring 90 rests on the flange 74 of the spacer.

Figure 3:
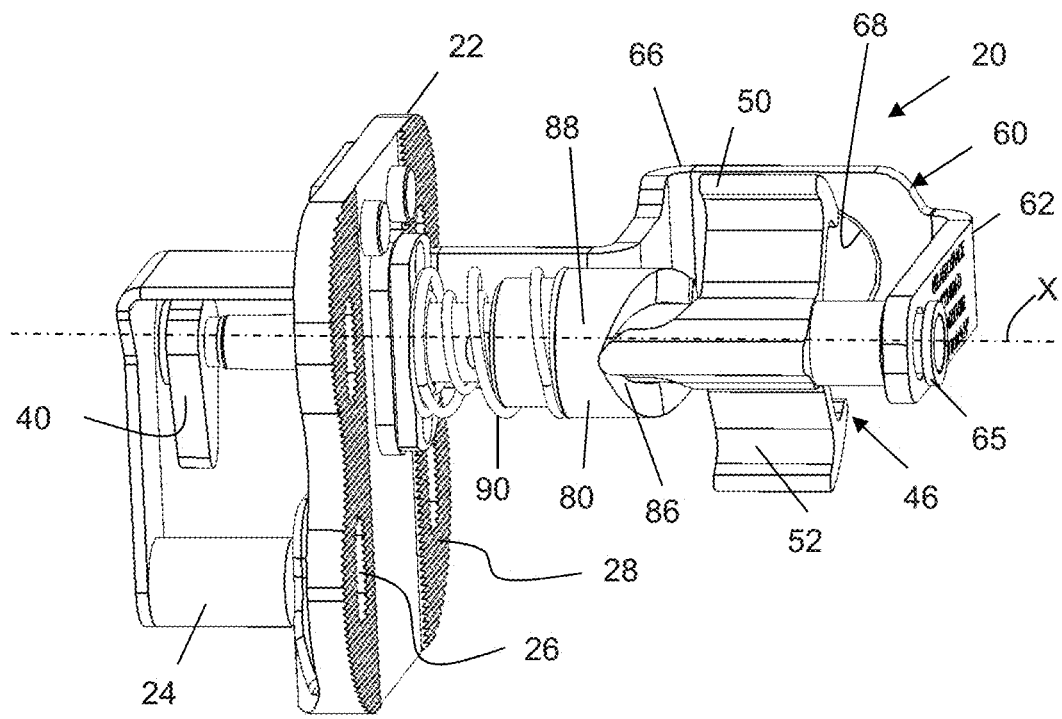
FIG. 3 is an isometric view of the keeper in FIG. 2, assembled, in an unlocked position.

The second end of the cam has a "V"-shaped cam profile 86 (FIGS. 3 to 5), which interacts with a pin 88 attached to the hub 48 and extending in the direction of the bracket 22 so as to always remain in contact with the cam profile 86 of the cam 80, which is pressed towards the position indicator by the compression spring 90, and which is inserted between the bracket 22 and the position indicator 46, whatever the angle of rotation of the position indicator 46 may be. In the unlocked position, the pin 88 is pressed into the recess of the V-cam profile (FIG. 3). In a locked position (FIGS. 4 and 5), the pin 88 is pressed against one edge of the V-cam profile, rotated by the blade 40 in one direction or the other. In the example shown, the V-cam profile is designed to allow the blade to rotate in both directions. If the blade 40 can only be turned in one direction, the cam profile 86 can be adjusted accordingly.

Use

When the latch bolt latches on to the keeper rod 24, the upper branch of hook 18 causes the blade 40 to rotate in one direction, causing the shaft 32 and position indicator 46 to rotate, since the shaft, blade and position indicator all rotate together. During this rotation, the pin 88 of hub 48 of the position indicator slides over the cam profile from the unlocked position where the pin is positioned at the bottom of the recessed V-shape to an upper edge of the V, pushing the cam 80 towards the bracket 22 and compressing the compression spring 90 between the cam and the flange 74 of the spacer. In this position and depending on the direction of rotation of the lock, the position sensor detects either strut 50 of the position indicator (FIG. 5) or the strut 52 (FIG. 4) due to its new position.

As long as the bolt is hooked on to the keeper rod 24, the blade is held in the locked position by the upper branch of the hook 18 and the pin 88 is retained on one edge of the cam profile 86, which has the effect of keeping the compression spring 90 compressed. The sensor still detects a strut 50, 52 and sends the locked signal continuously or periodically, for example to the cabin or to a monitoring system.

When the latch bolt is released from the keeper rod 24, the compression spring 90 pushes the cam 80 in the opposite direction to the bracket 22, bringing the pin 88 back into the recess of the V-cam profile. In doing so, the position indicator 46 rotates against the locking direction and returns the blade 40 to the unlocked position in which it is held steady by the action of the compression spring 90. The struts 50, 52 are again outside the detection range of the position sensor, and a signal in the cabin indicates that the lock is unlocked. The V-shape and compression spring hold the blade and position indicator in the unlocked position and prevent unwanted rotation of the assembly.

Where the position indicator 46 is a marking such as a bar code or an electronic chip, the pin 88 is a component that is separate from the position indicator 46. It can be constructed as a cylindrical body mounted on the shaft 32, between the cam 80 and the position indicator 46. In this design, the pin will not be able to rotate independently of the shaft 32 and will not be able to move along the shaft 32, just like the position indicator 46.

The keeper of this invention (a version of which has been described in detail) may take other forms as long as they do not deviate from the principles which have been set out in this detailed description of the assembly.

In particular, the shaft 32 does not necessarily need to pass through the bracket 22 and can be mounted in such a way that it can rotate between the bracket and a housing located on the same side as the keeper rod 24. In this arrangement, which is not shown, the position indicator and the mechanism for returning the blade to the unlocked keeper position when the bolt is unlatched from the keeper rod, such as blade 40, are then located on the first surface 27 side of the bracket. In this configuration, the shaft 32 is preferably a hollow shaft that can be rotated around a fixed shaft mounted at the ends on the bracket 22 and the housing.

In this arrangement the blade and the position indicator may consist of a single unit, which is formed by assembling basic parts or may form a single piece, which may be an integral part of the hollow shaft on which the said blade and position indicator are mounted.

The keeper operates simply, without excessive friction, and reliably. It detects the locked and unlocked position of a lock mounted on a helicopter or aircraft door, whether it is a passenger door or a cargo door. It can also be used with all types of flaps or articulated cowls such as landing gear hatches or engine cowling, as there have been cases of turbojet cowling opening in flight.

A version with a shaft passing through the bracket, such as the one described in detail and illustrated in the figures, is suitable when the position indicator component is to be incorporated into the frame of the opening that is closed by the panel, for example in order to protect this position indicator component.

A version with a shaft that does not pass through the bracket has the advantage of minimal interference with the frame of the opening by enabling it to be mounted on a surface, for example to replace a conventional keeper with this newly invented keeper as part of an upgrading of an existing aircraft.

Of course, this keeper can be used for all kinds of structures with doors or panels equipped with locks that must be easily and reliably checked for proper locking, and that do not restrict aircraft structures.

In a configuration in which sensors are used which can detect an identifier carried on the position indicator, for example a unique bar code or a code borne on an RFID component, a system for monitoring the locking of the locks of one or more doors or hatches will be able to indicate not only whether a lock is not correctly locked, but also to indicate to an operator which door or hatch has a latching failure, whether that failure occurs during closing or later, particularly in flight in the case of an aircraft.

The invention claimed is:

1. A keeper to interact with a latch bolt of a lock, the keeper comprising a bracket for attachment to a structure, and a keeper rod attached to the bracket, with the keeper rod extending from a first surface of the bracket, characterized in that:
    a shaft is secured to the bracket and rotates freely with respect to said bracket so as to extend in a longitudinal direction (X);
    a blade is rotationally-fixed arranged on the shaft on one side of the bracket close to the keeper rod;
    an angular position indicator is rotationally-fixed arranged on the shaft;
    the blade being disposed in such a way that it can be rotated by the latch bolt when the latch bolt hooks on to or unhooks from the keeper rod, and the angular position indicator being capable of indicating the angular position of the blade; and
    means for returning the blade to a stable, unlocked position and the angular position indicator to an open position when the latch bolt is unlatched from the keeper rod and no force is being applied to the blade and wherein the means for returning the blade to the stable unlocked position includes a compression spring and a cam located between the bracket and the position indicator, the cam being fixed in rotation and freely movable in the longitudinal direction, the cam being designed to return and maintain the shaft in the open position of the angular position indicator when no force is being applied to the blade.

2. A keeper according to claim 1, wherein the cam includes a recessed V-shaped cam profile, the keeper further including a pin which rotates along with the shaft, said pin being slidable on the V-shaped cam profile by the effect of the rotation of the blade and by the elastic effect of the spring which keeps the cam in contact with said pin.

3. A keeper according claim 1, wherein the angular position indicator includes a hub mounted so as to rotate along with the shaft.

4. A keeper as claimed in claim 3, wherein the angular position indicator includes at least one strut extending radially outwardly from the hub.

5. A keeper according to claim 2, wherein the angular position indicator includes a hub mounted so as to rotate along with the shaft and wherein the pin capable of sliding over the cam profile is secured to the hub of the position indicator.

6. A keeper according to claim 3, wherein the shaft includes a flat bar at each end, the blade and hub each including a flat on an inner surface of an opening in said blade and an opening in said hub, the flats being capable of interacting with the flat bars of the shaft to block rotation of the blade and the hub on the shaft when said shaft is engaged in said openings.

7. A keeper according to claim 1, wherein the cam and spring are free to slide on a spacer, said spacer being fixed relative to the bracket and receiving a portion of the shaft in an axial hole of said spacer.

8. A keeper according to claim 7, wherein the spacer includes a flat bar on an outer surface, and the cam includes a flat on an inner surface, the flat bar of the cam being capable of interacting with the flat of the spacer to block rotation of the cam on the spacer.

9. A keeper according to claim 1 having a housing with an opening facing the position indicator to enable a sensor to provide a position reading.

10. A keeper according claim 1, wherein the shaft, blade and angular position indicator are located on one side of the bracket, on the side of the first surface of said bracket from which the keeper rod extends.

11. A keeper according to claim 1 in which:
    the shaft passes through the bracket so as to extend on either side of said bracket;
    the blade is rotationally-fixed arranged at one end of the shaft;
    the angular position indicator is rotationally-fixed arranged at a second end of the shaft, opposite the first end.

12. A keeper according to claim 11 further comprising wherein the compression spring and cam are located between a second surface of the bracket, opposite the first surface, and the angular position indicator.

13. A keeper according to claim 11, wherein the angular position indicator includes a hub mounted so as to rotate along with the shaft and wherein the hub is rotationally-fixed arranged close to the second end of the shaft.

14. A keeper as claimed in claim 11 having a housing attached to the bracket, said housing including a first opening on a strut facing the second surface of the bracket for receiving the second end of the pin.

15. A keeper according to claim 14, wherein the housing includes a second opening on a strut positioned opposite the position indicator to enable a sensor to provide a position reading.

16. An aircraft with at least one movable panel equipped with at least one lock with a latch bolt, characterized in that at least one structure on the aircraft is equipped with a keeper according to claim 1, the keeper rod of which interacts with the bolt of the at least one lock to hold the movable panel in a locked position on the structure.

17. An aircraft according to claim 16, in which the movable panel is a door, or a hatch, or an engine cowling.

* * * * *